April 27, 1937.  I. L. EASTMAN  2,078,486

OIL DISPENSING APPARATUS

Original Filed Sept. 5, 1933  4 Sheets-Sheet 2

Inventor
Ivan L. Eastman
By Bair, Freeman & Sinclair
Attorneys

Witness
H. S. Menzenmaier

April 27, 1937.   I. L. EASTMAN   2,078,486
OIL DISPENSING APPARATUS
Original Filed Sept. 5, 1933   4 Sheets-Sheet 4
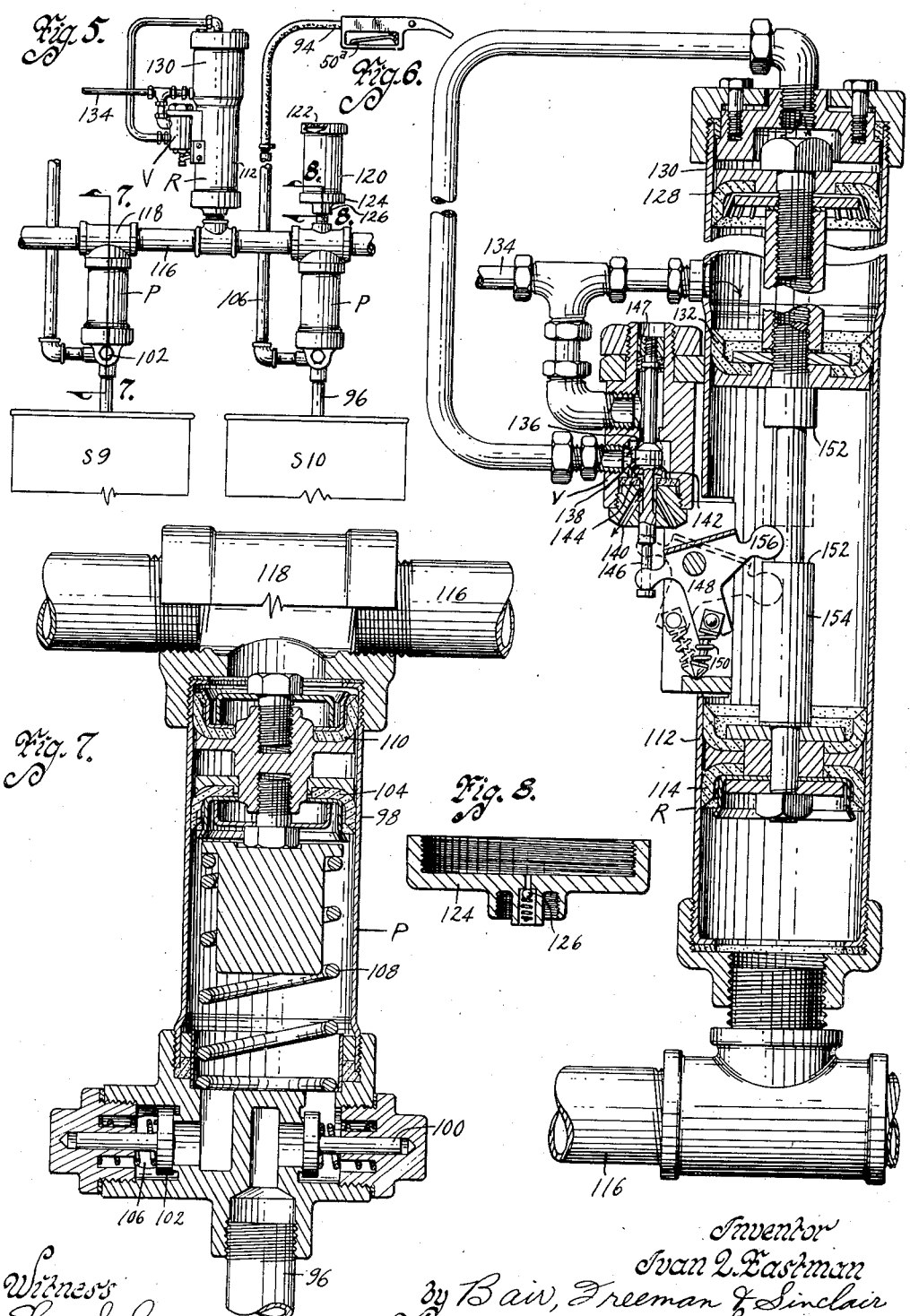

Patented Apr. 27, 1937

2,078,486

UNITED STATES PATENT OFFICE 2,078,486

OIL DISPENSING APPARATUS

Ivan L. Eastman, Bryan, Ohio, assignor to The Aro Equipment Corporation, Bryan, Ohio, a corporation of Ohio Application September 5, 1933, Serial No. 688,119
Renewed July 5, 1935

37 Claims. (Cl. 221—103)

The object of my invention is to provide an oil dispensing apparatus which is simple, durable and comparatively inexpensive to manufacture.

A further object of my present invention is to provide an apparatus for dispensing liquids in general, and oils in particular, the apparatus being arranged so that through a single measuring mechanism and dispensing hose a selected one of a variety of cylinder oils, for automobile engines for instance, may be dispensed and the apparatus including a nozzle which can be operated to dispense any number of predetermined quantities of the liquid as desired.

A further object is to provide an automatically operable mechanism in which the mere removal of a dispensing nozzle from a supporting hook causes the commencement of a dispensing operation for a given quantity of liquid, the completion of the operation being effected by opening a discharge valve on the dispensing nozzle.

Still a further object is to repeat the cycle of operations without hanging the nozzle back on its supporting hook, this being accomplished by a control operable at the nozzle when desired.

More particularly, it is my object to provide a pneumatically operated mechanism for measuring and dispensing quantities of liquids, such as cylinder oil, from any one of a number of storage tanks, each having a lubricant of different grade or the like, so that the apparatus can be utilized in a service station as a means for dispensing any desired type or grade of cylinder oil without occupying a prohibitive amount of space.

Another object is to provide dispensing mechanism in which after the dispensing operation, air is blown through the piping, the dispensing hose and nozzle to clean out the oil therein.

Still another object is to provide an indicating means operable after a dispensing and cleaning out operation to indicate that a predetermined quantity of oil or the like has been dispensed.

Still a further object is to provide a modified form of construction in which a plurality of nozzles are provided, one for each storage tank and each tank has a pumping mechanism, all operated from a common actuating mechanism, the actuating mechanism being automatically operable and normally ineffective, but rendered effective by the opening of any one of the discharge nozzles.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 5 is a side elevation of a modified form of dispensing apparatus.

Figure 6 is a vertical sectional view of a portion thereof showing the parts on an enlarged scale.

Figure 7 is an enlarged sectional view on the line 7—7 of Figure 5; and

Figure 8 is an enlarged sectional view on the line 8—8 of Figure 5.

Figure 1:
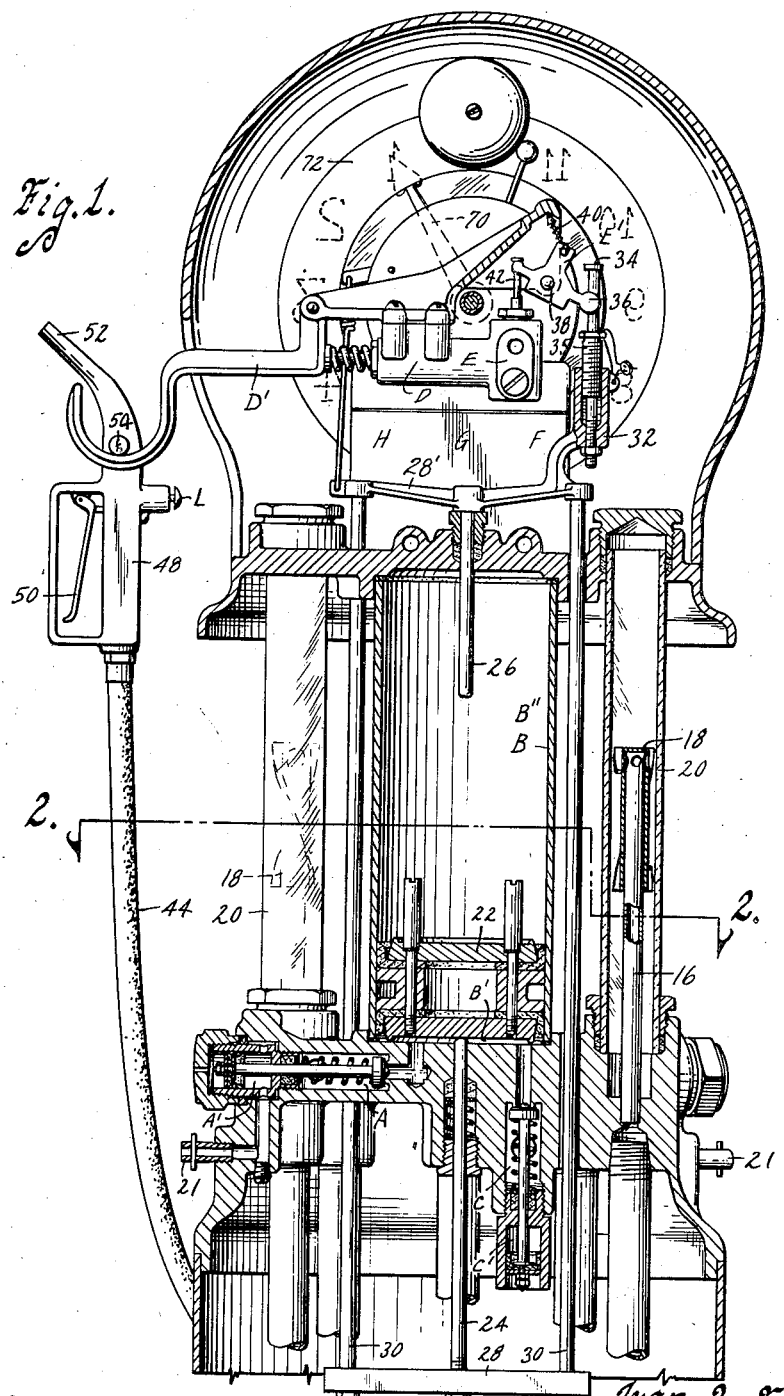
Figure 1 is a vertical sectional view through the upper portion of a stand-like fixture in which the mechanism embodying my liquid dispensing apparatus is mounted.
Figure 2:
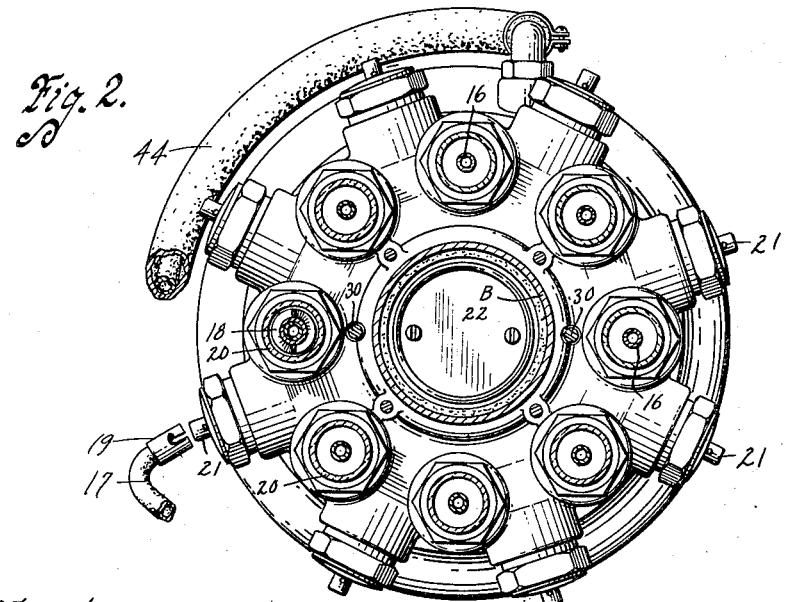
Figure 2 is a horizontal sectional view on the line 2—2 of Figure 1.
Figure 3:
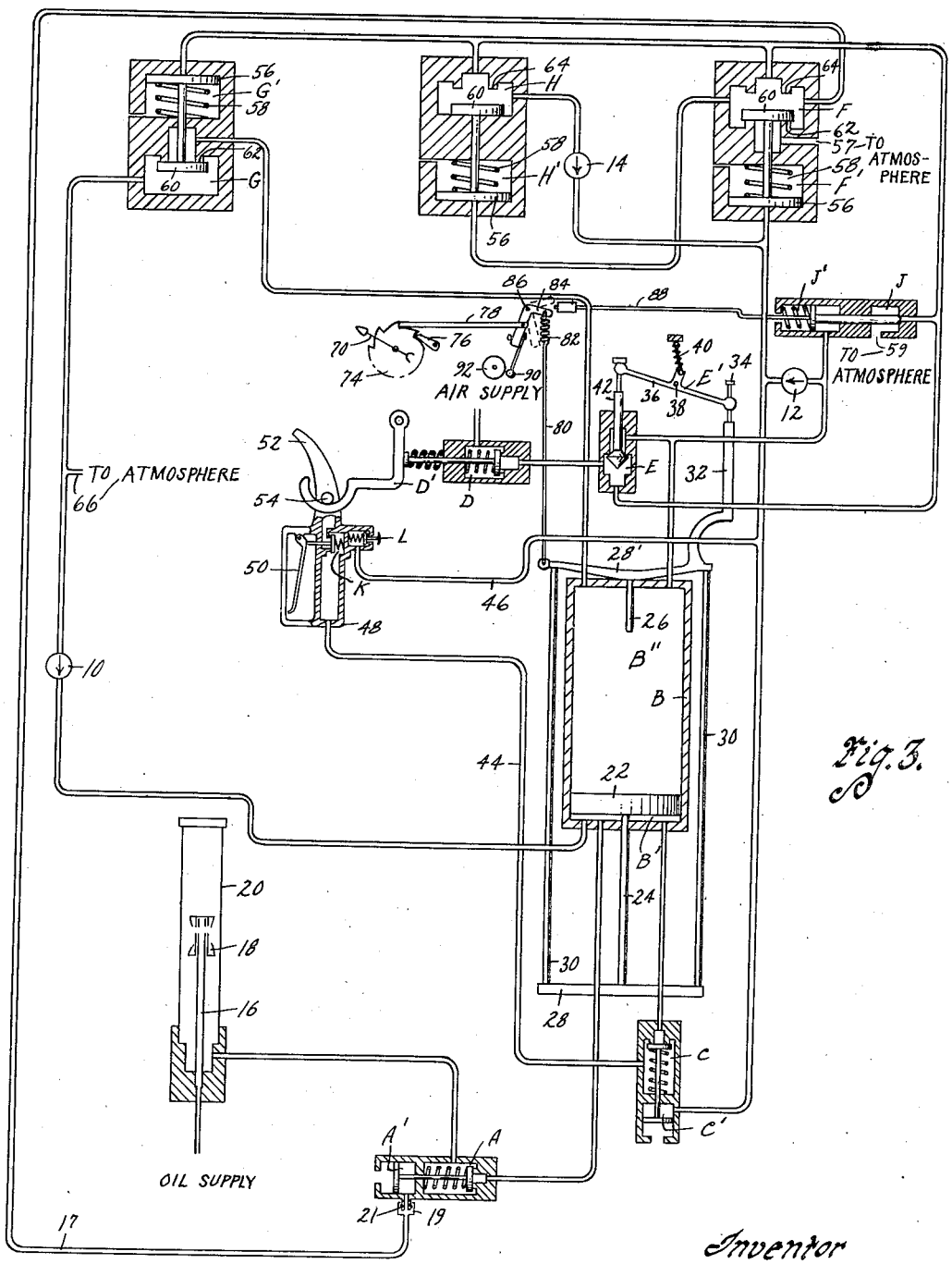
Figure 3 is a diagrammatic view of the various valves, their actuating means, the liquid measuring and dispensing pump, the dispensing nozzle, etc. of my invention.

On the accompanying drawings, I have used the reference character A to indicate an oil supply valve. As shown in Figures 1 and 3, it is normally seated by a spring, but can be unseated by a piston within a cylinder when air is admitted thereto from an air hose 17. The air hose 17 has a disconnectible connection at 19 with a connecting element 21 of the valve actuator A'.

There are a plurality of valves A, numbered A, A2, A3, A4, A5, A6, A7 and A8. Each of the valves A receives oil from its respective storage tank S, S2, S3, S4, S5, S6, S7 and S8, as clearly shown in Figure 4. The purpose of the plurality of storage tanks is so that eight, or any number of grades of oil can be dispensed from one fixture.

From the storage tank the oil first flows upwardly through a pipe 16 and then discharges into a cap 18 having vanes and perforations so that the oil flows out of the perforations and on the vanes, causing the cap 18 to rotate and thus indicating a flow of oil through the particular glass observation tube 20 in which the stand pipe 16 having oil flowing therefrom is mounted.

From the base of the observation tube 20 the oil flows laterally into the valve A corresponding to the tube and from there it can flow upwardly into a cylinder B. The cylinder B has a piston 22 therein, below which is an oil chamber B' and above which is an air chamber B''.

The piston 22 is adapted to reciprocate in the cylinder B and when it reaches its lower limit it engages a rod 24 while it engages a rod 26 at the upper limit of its movement. The rods 24 and 26 are carried by cross arms 28 and 28' which are connected by rods 30. The assembly of the elements 24 to 30 inclusive reciprocates a boss 32 in which is adjustably mounted a stop rod 34. A stop sleeve 35 is also mounted in the boss and can be adjusted for the purpose of correcting the measured amount of liquid dispensed and then sealed as illustrated.

Receiving oil from the chamber B' of the cylinder B is a normally closed oil outlet valve C having an actuating mechanism C'. A normally closed cut-off valve D is interposed between the air supply as indicated in the drawings and my dispensing apparatus. The actuating mechanism for the cut-off valve D is a supporting arm D' which is normally in lowered position for closing the valve D. A master valve E of three way construction is associated with the air supply cut-off valve D for controlling air therefrom to the dispensing apparatus. The actuating mechanism E' for the valve E consists of a toggle lever 36 pivoted at 38 and actuated by the head of the stop rod 34 and upper end of the stop sleeve 35. The toggle action is produced by an over-center spring 40. The toggle lever 36 engages the valve plunger 42 of the master valve E to move it to its opposite positions in accordance with the movement of the boss 32 produced by the reciprocating piston 22 in the cylinder B.

My apparatus further includes a selector and charging control valve F, of four way type for controlling the actuating mechanism A' and C', in which a plug 60 is normally against a seat 62 because of the action of the spring 58, but which can be transferred from the seat 62 to a seat 64 by compressed air being introduced behind the piston 56. The spring 58 and the piston 56 constitute the actuating means, designated as F', for the valve F. A blow out and exhaust valve G is provided, having an actuating mechanism G'. A charging valve H is also provided, having an actuating mechanism H' and a restricted entrance at its top for compressed air. The valves G and H have the elements 56, 58, 60, 62 and 64, except the valve G is a normally closed two way valve, having only the seat 62 while the valve H is a normally open two way valve having only the seat 64. Vents 55 are provided in the actuators F', G' and H' to prevent undesired back pressure.

A bleeder valve J for actuator G' is provided which is normally closed but can be opened by the introduction of compressed air into its actuating mechanism J'. The piping between the various valves and actuating mechanisms is clearly shown on Figure 3 of the drawings. The valves F and J have bleeder ports 57 and 59 respectively to atmosphere.

My apparatus includes a dispensing nozzle 48 having a dispensing trigger 50 (for opening a normally closed valve K) and a discharge nozzle 52. Pins 54 extend from the nozzle 48 for coaction with the actuating arm D' of the cut-off valve D, the arm being of forked construction.

The nozzle 48 includes a bleeder valve L for the actuators F' and C' which can be depressed by the operator's thumb.

Figure 4:
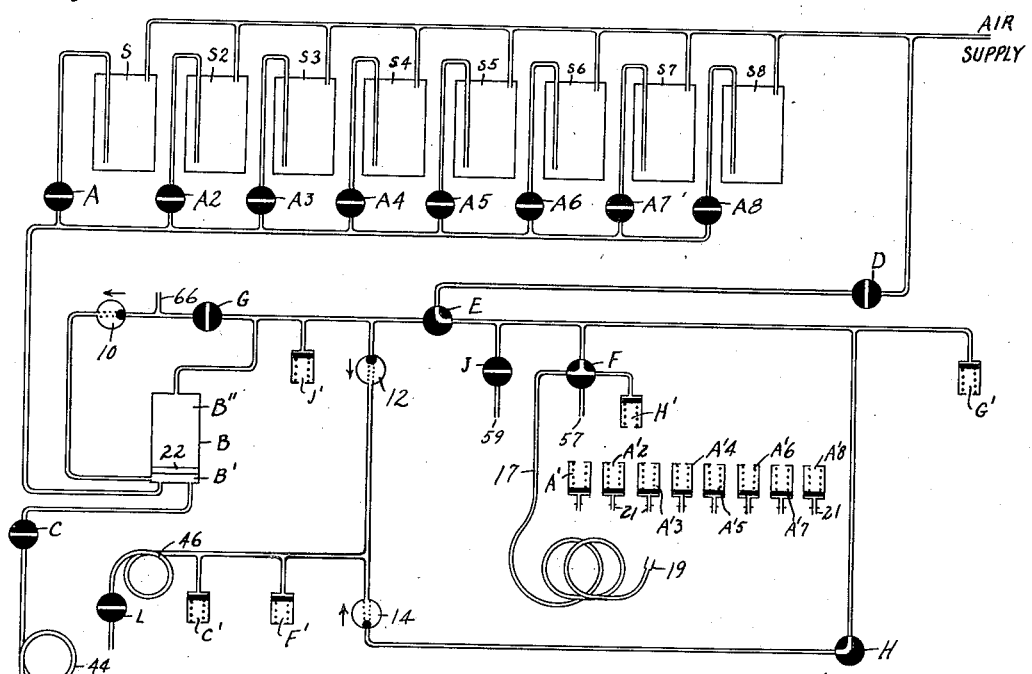
Figure 4 is a simplified diagrammatic view showing the parts of the apparatus in their initial positions.

Check valves 10, 12 and 14 are mounted in the pipe lines, as shown in Figures 3 and 4, and between the check valve 10 and the valve H a small port 66 to atmosphere is provided.

*Practical operation*

In order to operate my apparatus the flexible hose 17 is first connected, by means of a connection element 19, to the connecting element 21 corresponding to the particular oil desired to be dispensed as shown in the observation tubes 20 or by numbers or letters of reference as desired. Assuming the various elements of the apparatus to be in the position shown in Figures 3 and 4, to dispense a predetermined quantity of oil, it is then necessary to unhook the nozzle 48 from the hook D' which will open the valve D permitting air to enter the valve E. The valve E, being in the position shown in Figures 3 and 4, will permit air to pass into the piping leading to the valves J, F and H and to the actuator G'. This can best be traced in the simplified diagram shown in Figure 4. At J the air is stopped. At F it flows to the actuator H', thereby reversing the position of the valve H so that the air cannot flow beyond the valve H. Since air to the valve H is restricted, insufficient air flows therefrom through the check valve 14 and to the actuators F' and C' to actuate them before the actuator H' has been fully actuated. The air flowing through the valve F also flows through the hose 17 to the particular actuator A', with which the connection 19 has been made. This will open the valve A for that particular actuator permitting the liquid under pressure from the storage tank for that particular valve to flow into the space B' beneath the piston 22 in the cylinder B, tending to force the piston upwardly.

The air from the valve E also actuates the actuator G'.

This allows the air trapped above the piston 22 to be exhausted through the valve G to atmosphere through the port 66, it being stopped by the check valve 10, which has the pressure of the oil from the valve A affecting it from the opposite direction, the check valve serving to prevent the oil flowing to the chamber B' from being discharged to atmosphere through the port 66.

The piston 22 will now rise until it strikes the rod 26 for changing the valve E to its other position. This occurs after a predetermined quantity (for instance one quart) of oil has been forced into the cylinder B. Changing of the valve E from its normal position in Figure 4 will cut off the air to the valves J, F and H and to the actuators A', H' and G'. It will instead supply air to the actuator J' for opening the valve J and bleeding the air from the actuator G' to atmosphere. This will close the valve G so that the air from the valve E will flow into the chamber B'' of the cylinder B instead of through the valve G to atmosphere through the port 66. Air from the valve E will also be supplied through the check valve 12 to the actuator C'. This will open the oil discharge valve C so that the compressed air being admitted above the piston 22 will discharge the measured quantity of oil through the valve C and the dispensing nozzle 52 when the trigger 50 is depressed. The air will also be supplied through the check valve 12 to the actuator F' causing the valve F to change its position and the actuators A' and H' therefor to be bled to atmosphere for respectively closing the air valve A and opening the valve H, the check valve 14 now holding the compressed air in the actuators C' and F' from passing first through the valve H and then through the valve J to atmosphere before the valve H has closed.

Completion of the oil dispensing operation occurs when the piston 22 reaches its lower limit and trips the valve E to its original position and cuts off the air supply to the chamber B''. This again causes the actuator G' to operate for opening the valve G. The compressed air in the chamber B' then rushes through the valve G and being of greater pressure than the spring in the check valve 10 passes through it for blowing out the trapped oil remaining in the chamber B' of the cylinder B and the valve C, hose 44, valve K and discharge nozzle 52. This is so that this trapped oil will not be mixed with the next quantity of oil discharged, which might be of a different grade. As soon as the compressed air through the valve G reduces to such a point that the check valve 10 will close, the remaining air leaks to atmosphere from the port 66 and the spring in the actuator J' closes the valve J so that it is in position for initial operation.

At this time the valves A, E, G and H are also in position for initial operation and the piston 22 is in its initial lowered position, the initial position of the valve H then keeping the actuators C' and F' charged through the check valve 14 to prevent them from returning to their initial positions if there are any air leaks and the actuator G' remaining charged with air from the valve E as long as the nozzle 52 is off the hook D'. The check valve 12 then prevents air from the valve H opening the bleeder valve J.

The discharging nozzle 48 can now be returned to the supporting hook D', unless it is desired to dispense another quart of oil. This can be done by keeping the trigger 50 depressed and depressing the valve L. Depression of the valve L bleeds the hose 46, thus also bleeding the actuators C' for returning the oil dispensing valve C to its initial position, and bleeds the actuator F' for returning it to its initial position.

Return of the valve F to its initial position permits the air from the valve E to flow into the actuators A' and H' and the cycle of operation is repeated the same as when the valve D was originally opened except that the valve G is already open. Additional quarts of oil can then be dispensed by the bleeding operation produced by depressing the valve L after each quart of oil is dispensed and the dispensing line blown out.

Since it is difficult to entirely eliminate air leaks in the apparatus, the actuators F' and C' will automatically return to the initial positions shown in Figure 3 if the nozzle 48 is left hanging on the hook D' long enough as this shuts off the air supply and such leakage would bleed the line 46. If, when unhooking the nozzle, the operator finds that such automatic bleeding has not been completed, he merely depresses the valve L to thus complete it manually.

In connection with my dispensing apparatus, I provide an indicating needle 70. It is adapted to coact with a dial 72 for indicating the number of quarts of oil dispensed. Its operation is illustrated diagrammatically in Figure 3.

For operating the indicating needle 70, I provide a ratchet wheel 74 normally retained against reverse rotation by a holding pawl 76. The ratchet wheel 74 is advanced one tooth at a time by an advancing pawl 78 operated in the advancing direction by a link 80 connected with the cross arm 28'. A closed coil spring 82 is interposed between the link 80 and a bell crank 84 pivoted at 86 and connected with the advancing pawl 78.

A lock rod 88 is connected with the actuating mechanism J' so as to normally not affect the needle 70, but when the piston 22 is traveling downwardly, the actuating mechanism J' will be charged with air and the lock rod 88 will be projected into the path of travel of the bell crank 84, which would at that time be in the dotted line position. Thus though the link 80 moves downwardly when the piston 22 reaches its lower limit of movement, the needle 70 will not be advanced until the air has been blown from the chamber B'' through the valve G and finally its pressure reduced sufficiently to allow the actuator J' to return to its normal position, whereupon the spring 82, which is at this time under tension, would then swing the bell crank 84 to the full line position of Figure 3 and move the indicating needle 70 one graduation on the dial 72. At the same time, a bell clapper 90 would strike a gong 92 to give an audible signal.

In Figures 5, 6, 7 and 8, I have shown a modified form of dispensing apparatus. Storage tanks are indicated at S9 and S10. I show only two of them, but it is to be understood any number desired can be used. Each storage tank has its own pumping mechanism P and dispensing nozzle 94. An actuating mechanism R is hydraulically associated with all of the pumping mechanisms P.

Each pumping mechanism P comprises an intake tube 96 extending to adjacent the bottom of the storage tank, a cylinder 98, an intake check valve 100, an outlet check valve 102 and a pump piston 104. The outlet check valve 102 communicates with piping 106 extending to the dispensing nozzle 94.

The pump piston 104 is normally raised by a spring 108 for drawing a predetermined quantity of oil in through the valve 100. The pump piston 104 is adapted to be propelled downwardly by a power piston 110 for discharging the predetermined quantity of indrawn oil out through the valve 102 when the valve handle 50a of the nozzle 94 is depressed.

The actuating mechanism R includes a cylinder 112 having an actuating piston 114 therein. The piston 114 is adapted to force oil into a piping 116 communicating with a head fitting 118 of each of the pumping mechanisms P.

The supply of oil in the piping 116 and cylinders 98 and 112 is maintained from a storage tank 120 having a vent 122 to atmosphere in its top. A bottom fitting 124 of the storage tank 120 is provided with a check valve 126, as shown in Figure 8. The hydraulic system, consisting of the upper ends of the cylinders 98, the fittings 118, the piping 116 and the lower end of the cylinder 112, is maintained full of oil by reason of the storage tank 120 being higher than the piping and the check valve 126 opening toward the piping but closing when there is any tendency for oil to be expelled through it from the piping. Any tendency to draw oil in through the check valve 126 will open the check valve and permit such.

Means is provided for reciprocating the actuating piston 114 and consists of a propelling piston 128 in a cylinder 130 slightly larger than the cylinder 112 and a retracting piston 132 in the cylinder 112. Compressed air is introduced from a supply pipe 134 to the space between the pistons 128 and 132, which constantly tends to raise them and the actuating piston 114 due to the piston 128 being slightly larger than the piston 132.

The pistons are driven downwardly however whenever air is introduced into the cylinder 130 above the piston 128 from a valve V. The valve V has a seat 136 against which a valve plug 138 may rest and a vent 140 controlled by a valve plug 142 adapted to seat against a seat 144.

The valve plugs 138 and 142 are mounted on a valve stem 146. A cup leather sealing means 147 is mounted on the valve stem to prevent the escape of air at the upper end of the valve V. To the valve stem 146, snap action is imparated by a lever 148 and an overcenter spring 150. The lever 148 is controlled by shoulders 152 of a piston rod 154 engaging a forked end 156 of the lever.

*Practical operation*

In the operation of the modification shown in Figures 5 to 8, the parts are normally in the position of Figure 6 with air from the supply line 134 being introduced past the valve seat 136 to the cylinder 130 above the piston 128 therein, thereby tending to force it downwardly.

It cannot move downwardly however because all of the pistons 104 in the pumping mechanisms P are held in raised position by the oil trapped outside the check valves 100, in the dispensing lines 106 and in the nozzles 94.

When the nozzle 94 of any storage tank is opened, however, this relieves the pressure so that the piston 128 will be forced downwardly, forcing oil from under the actuating piston 114 to above the power piston 110 in the particular pump P, the nozzle 94 of which has been opened. This will deliver a predetermined quantity of oil as the piston 128 and consequently the piston 104 will be moved down a predetermined distance, this distance being determined by the upper shoulder 152 tripping the lever 148 and consequently the valve stem 146 to its opposite position. When so tripped, the supply of air is cut off from the pipe 134 to the upper end of the piston 128 by the valve plug 138 and the valve plug 142 is moved from the valve seat 144, thereby permitting the trapped air therein to exhaust to atmosphere through the vents 140.

The air between the pistons 128 and 132 will then move them upwardly, drawing oil in beneath the actuating piston 114 and also from above the power piston 110. The spring 108 will assist in raising the piston 104 which draws a new charge of oil in through the valve 100 to be dispensed upon the next downward movement of the piston 128.

If the valve 50a of the nozzle 94 is closed during the return period of the piston 128, the piston will return to its upper limit of movement and trip the valve V to the position shown in Figure 6, preparatory to another dispensing operation from any of the nozzles 94. However, if the valve 50a is held open, a second predetermined quantity of oil will be dispensed as soon as the valve V is tripped to the full line position of Figure 6 and any number of such quantities can be dispensed by the proper manipulation of the valve 50a.

It will be obvious that opening the nozzle valve 50a of any nozzle 94 will cause automatic operation of the dispensing apparatus and thus a single mechanism R can be utilized for actuating any number of the pumps P, although it is necessary that only one nozzle 94 be used at one time.

Although I have shown pneumatic actuators for the various valves, it is obvious that other types of actuators can be used, such as electrically controlled solenoids or hydraulic types of actuators. A change of this character and others can be made without departing from the real spirit and purpose of my invention and it is my intention to cover by my claims any modified forms of structure or use of mechanical equivalents which may be reasonably included within their scope.

I claim as my invention:

1. In a liquid dispensing apparatus, a storage tank, a dispensing mechanism, a dispensing nozzle and means for dispensing a quantity of liquid from said storage tank through said dispensing mechanism to said dispensing nozzle comprising a support for said dispensing nozzle and means operable by relieving said support of the weight of said nozzle to cause operation of said dispensing mechanism to cause said dispensing operation and to discharge compressed air through the dispensing mechanism and the dispensing nozzle at the completion of the dispensing operation.

2. In a liquid dispensing apparatus, a storage tank, dispensing mechanism comprising a cylinder and a piston movable therein, a dispensing nozzle and means for dispensing a quantity of liquid from said storage tank through said dispensing mechanism to said dispensing nozzle comprising means to move said piston in one direction to cause reception of such quantity from said storage tank into said cylinder, a trip device operated by said piston upon completion of the movement thereof in said direction, said trip device effecting movement of said piston in the opposite direction and thereby forcing such quantity of liquid to said dispensing nozzle and a valve opened by said piston upon completion of the movement thereof in said opposite direction and operable to admit a quantity of air to said dispensing mechanism and said nozzle.

3. In a liquid dispensing apparatus, a plurality of storage tanks, dispensing mechanism, a dispensing hose, a dispensing nozzle and means for dispensing a quantity of liquid selectively from any of said storage tanks through said dispensing mechanism and said dispensing hose to said dispensing nozzle comprising an exhaust valve operable to permit such quantity to flow from said storage tank into said dispensing mechanism and a valve operable to admit compressed air to said dispensing mechanism and thereby force such quantity through said dispensing hose to said dispensing nozzle, said first valve being connected with said dispensing hose and being then operable to blow air thereinto from said dispensing mechanism.

4. In a liquid dispensing apparatus, a plurality of individual storage tanks, a dispensing pump, communicating means between each storage tank and said dispensing pump, a valve in each communicating means, a single dispensing nozzle communicating with said dispensing pump and means for dispensing a quantity of liquid selectively from any of said storage tanks through said dispensing pump to said dispensing nozzle comprising an actuating mechanism selectively cooperable with any of said valves to open them upon subsequent operation of said actuating mechanism, an exhaust valve operable to cause said dispensing pump to receive such quantity from the selected storage tank and a second valve operable by movement of said dispensing pump to filled position to admit compressed air to said dispensing pump to thereby force such quantity to said dispensing nozzle.

5. In a liquid dispensing apparatus, a plurality of individual storage tanks, dispensing mechanism having a valved communication with each storage tank, a single dispensing nozzle communicating with said dispensing mechanism and means for dispensing a quantity of liquid selectively from any of said storage tanks through said dispensing mechanism to said dispensing nozzle comprising an actuating mechanism selectively cooperable with the valve of any of said storage tanks and operable to operate said valves to thereby cause said dispensing mechanism to receive such quantity from the selected storage tank, means to force such quantity from said dispensing mechanism to said dispensing nozzle and a valve operated by said dispensing mechanism at the completion of dispensing such quantity to admit air to said nozzle to clean out the film of last dispensed liquid from the inner walls thereof.

6. In apparatus of the character described, a dispensing and measuring pump, means for automatically causing a cycle of liquid intaking and discharging thereby from any one of a plurality of storage tanks, said means comprising an initiating device operable to take liquid into the dispensing and measuring pump, a discharging device operable by said pump becoming filled to discharge liquid therefrom and air controlled means operable by said pump becoming empty to clean the trapped, last dispensed liquid from the interior surface of the discharge line from said pump.

7. In apparatus of the character described, a dispensing and measuring pump, means for automatically initiating a dispensing cycle of said measuring pump, means to bleed air from a portion of said apparatus, means for rendering the initiating means inoperative when said pump has been filled with liquid, means for discharging by compressed air, liquid from said pump, means actuated by said pump for operating said last named means, a discharge line for said pump, an outlet valve for controlling said line and means actuated by compressed air for opening said outlet valve and by bleeding air from said portion of said apparatus for closing said outlet valve.

8. Apparatus of the character described comprising a plurality of storage tanks, a pump for selectively receiving liquid from any one of said tanks, a discharge nozzle for discharging the received liquid from the pump, compressed air operated means for operating said pump through a dispensing cycle, and automatic means including a control valve for controlling air to said compressed air operated means, said valve being normally closed by association of the dispensing nozzle therewith and openable by their disassociation, said automatic means also including a blow valve operable after said pump has been emptied to blow out said nozzle.

9. In a liquid dispensing apparatus, a plurality of storage tanks, a dispensing cylinder having a piston therein, a conduit for admitting oil from any one of said storage tanks to one end of said cylinder, a conduit for discharging oil from said end of said cylinder, a valve for exhausting air from the other end of said cylinder, a second valve for admitting compressed air to said other end, said valves being operated by said piston assuming its opposite limits of travel and means to conduct air exhausted from said cylinder to said second mentioned conduit.

10. In a liquid dispensing apparatus, a plurality of storage tanks, a dispensing cylinder having a piston therein, a conduit for admitting oil from any one of said storage tanks to one end of said cylinder, a conduit for discharging oil from said end of said cylinder, a valve and a port for exhausting air from the other end of said cylinder to atmosphere, a second valve for admitting compressed air to said other end, said valves being operated by said piston assuming its opposite limits of travel, means to conduct air exhausted from said cylinder to said second mentioned conduit, at the completion of the oil dispensing operation of the cylinder and a check valve opening toward said dispensing cylinder, and located in said means to conduct air to prevent oil when entering said cylinder from being discharged through said port.

11. In a liquid dispensing apparatus, a dispensing cylinder, a plurality of storage tanks, a liquid supply valve for each storage tank and connected with said dispensing cylinder, a discharge hose, a liquid dispensing valve between said dispensing cylinder and said discharge hose, a master valve and an exhaust valve respectively controlling a supply of compressed air to said dispensing cylinder and the exhaust of air therefrom, a selector operable to actuate a selected one of said liquid supply valves, a bleeder line, connected with said liquid dispensing valve to close it when bled, a charging valve to charge said bleeder line at the completion of the dispensing operation and a bleeder valve for bleeding said bleeder line to initiate operation of the apparatus to cause another dispensing operation when desired.

12. In a liquid dispensing apparatus, a dispensing cylinder, a plurality of storage tanks, a liquid supply valve for each storage tank and connected with said dispensing cylinder, a discharge hose, a liquid dispensing valve between said dispensing cylinder and said discharge hose, a master valve and an exhaust valve respectively controlling a supply of compressed air to said dispensing cylinder and the exhaust of air therefrom, a cut off valve between an air supply and said master valve and having a hook to support said discharge hose when it is not in use, said hook normally opening said cut off valve but closing it when said discharge hose is supported thereon, a selector operable to actuate a selected one of said liquid supply valves, a bleeder line, connected with said liquid dispensing valve to close it when bled, a charging valve to charge said bleeder line at the completion of the dispensing operation and a bleeder valve for bleeding said bleeder line to initiate operation of the apparatus to cause another dispensing operation when desired.

13. In a liquid dispensing apparatus, a dispensing cylinder, a plurality of storage tanks, a liquid supply valve for each storage tank and connected with said dispensing cylinder, a discharge hose, a liquid dispensing valve between said dispensing cylinder and said discharge hose, a master valve and an exhaust and blow out valve respectively controlling a supply of compressed air to said dispensing cylinder and the exhaust of air therefrom, a selector and charging control valve operable to actuate a selected one of said liquid supply valves, a bleeder line, a charging valve to charge said bleeder line at the completion of the dispensing operation, a bleeder valve for bleeding said bleeder line to initiate operation of the apparatus to cause another dispensing operation, said exhaust and blow out valve being connected with said discharge hose, a check valve in the connection and closing toward said exhaust and blow out valve to prevent oil from the hose backing into the exhaust and blow out valve and a port in said connection and opening to atmosphere to permit the dispensing cylinder to be filled with liquid.

14. In a liquid dispensing apparatus, a dispensing cylinder, a plurality of storage tanks, a liquid supply valve for each storage tank and connected with said dispensing cylinder, a discharge hose, a liquid dispensing valve between said dispensing cylinder and said discharge hose, a master valve and an exhaust valve for respectively controlling a supply of compressed air to said dispensing cylinder and the exhaustion of air therefrom, an actuator for each of said liquid supply valves, said master valve being selectively connectible with a desired one of said actuators to supply compressed air thereto when open, a selector control valve operable to actuate a selected one of said liquid supply valves, a bleeder line connected with said liquid dispensing valve to close it when bled, a charging valve to charge said bleeder line at the completion of the dispensing operation and a bleeder valve for bleeding said bleeder line to initiate operation of the apparatus to cause another dispensing operation.

15. In a liquid dispensing apparatus, a storage tank, a dispensing mechanism, a dispensing hose and means for dispensing a quantity of liquid from said storage tank through said dispensing mechanism and said dispensing hose comprising an exhaust valve operable to permit such quantity to flow under pressure from said storage tank into said dispensing mechanism and a valve operable to admit actuating fluid to said dispensing mechanism and thereby force such quantity through said dispensing hose, said exhaust valve being connected with said dispensing hose and being operable to blow air thereinto from said dispensing mechanism at the completion of the liquid dispensation.

16. In a liquid dispensing apparatus, a dispensing cylinder, a piston reciprocable therein, a liquid supply tank hydraulically connected with one end of said cylinder, a liquid supply valve between said tank and said cylinder, a nozzle hydraulically connected with said end of said cylinder, a liquid dispensing valve between said cylinder and said nozzle, an actuator for said liquid supply valve, an actuator for said liquid dispensing valve, a master valve connected with the other end of said cylinder, an exhaust valve connected with said other end of said cylinder, an actuator for said master valve operable by movement of said piston, an actuator for said exhaust valve, a control valve actuator therefor, said master valve being connected with said control valve and with said exhaust valve actuator to supply actuating fluid thereto at the beginning of the filling operation of said cylinder, said control valve being connected with said liquid supply valve actuator to supply actuating fluid thereto at the beginning of said filling operation, said master valve also being connected with said control valve actuator and with said liquid dispensing valve actuator for respectively supplying actuating fluid to the control valve actuator at the completion of said filling operation and thereby releasing actuating fluid from said liquid supply valve actuator and supplying actuating fluid to said liquid dispensing valve actuator so that the liquid in said cylinder may be dispensed therefrom to said nozzle, said master valve also at said completion of the filling operation supplying actuating fluid to said cylinder through its connection therewith to move said piston in a dispensing direction.

17. In combination with the elements of claim 16, a charging valve connected with said master valve to receive actuating fluid therefrom at the beginning of the filling operation and connected with said control valve actuator and said liquid dispensing valve actuator to keep them charged with actuating fluid while said charging valve is open and an actuator for said charging valve connected with said control valve.

18. In combination with the elements of claim 16, a bleeder valve connected with said exhaust valve actuator and an actuator for said bleeder valve, said bleeder valve actuator being connected with said master valve to receive actuating fluid therefrom at the completion of said filling operation to bleed said exhaust valve actuator and thereby close said exhaust valve.

19. In combination with the elements of claim 16, a charging valve connected with said master valve to receive actuating fluid therefrom at the beginning of the filling operation and connected with said control valve actuator and said liquid dispensing valve actuator to keep them charged with actuating fluid while said charging valve is open, an actuator for said charging valve connected with said control valve, a bleeder valve connected with said exhaust valve actuator and an actuator for said bleeder valve, said bleeder valve actuator being connected with said master valve to receive actuating fluid therefrom at the completion of said filling operation to bleed said exhaust valve actuator and thereby close said exhaust valve.

20. In combination with the elements of claim 16, a charging valve connected with said master valve to receive actuating fluid therefrom at the beginning of the filling operation and connected with said control valve actuator and said liquid dispensing valve actuator to keep them charged with actuating fluid while said charging valve is open, an actuator for said charging valve connected with said control valve and a supply valve connected between a source of actuating fluid and said master valve, said nozzle being supportable thereon when not in use and operable to close said supply valve when so supported.

21. In combination with the elements of claim 16, a bleeder valve connected with said exhaust valve actuator, an actuator for said bleeder valve, said bleeder valve actuator being connected with said master valve to receive actuating fluid therefrom at the completion of said filing operation to bleed said exhaust valve actuator and thereby close said exhaust valve and a supply valve connected between a source of actuating fluid and said master valve, said nozzle being supportable thereon when not in use and operable to close said supply valve when so supported.

22. In combination with the elements of claim 16, a charging valve connected with said master valve to receive actuating fluid therefrom at the beginning of the filling operation and connected with said control valve actuator and said liquid dispensing valve actuator to keep them charged with actuating fluid while said charging valve is open, an actuator for said charging valve connected with said control valve, a bleeder valve connected with said exhaust valve actuator, an actuator for said bleeder valve, said bleeder valve actuator being connected with said master valve to receive actuating fluid therefrom at the completion of said filling operation to bleed said exhaust valve actuator and thereby close said exhaust valve and a supply valve connected between a source of actuating fluid and said master valve, said nozzle being supportable thereon when not in use and operable to close said supply valve when so supported.

23. In combination with the elements of claim 16, a charging valve connected with said master valve to receive actuating fluid therefrom at the beginning of the filling operation and connected with said control valve actuator and said liquid dispensing valve actuator to keep them charged with actuating fluid while said charging valve is open, an actuator for said charging valve connected with said control valve, a bleeder valve connected with said exhaust valve actuator, an actuator for said bleeder valve, said bleeder valve actuator being connected with said master valve to receive actuating fluid therefrom at the completion of said filling operation to bleed said exhaust valve actuator and thereby close said exhaust valve and a check valve between said charging valve and said control and liquid dispensing valve actuators to prevent actuating fluid from said actuators being bled through said charging valve and said bleeder valve to atmosphere.

24. In combination with the elements of claim 16, a charging valve connected with said master valve to receive actuating fluid therefrom at the beginning of the filling operation and connected with said control valve actuator and said liquid dispensing valve actuator to keep them charged with actuating fluid while said charging valve is open, an actuator for said charging valve connected with said control valve, a bleeder valve connected with said exhaust valve actuator, an actuator for said bleeder valve, said bleeder valve actuator being connected with said master valve to receive actuating fluid therefrom at the completion of said filling operation to bleed said exhaust valve actuator and thereby close said exhaust valve and a check valve between said charging valve and said bleeder valve to prevent actuating fluid from said charging valve opening said bleeder valve.

25. In combination with the elements of claim 16, the outlet of said exhaust valve being hydraulically connected with said nozzle and having an exhaust port to atmosphere in the connection and a check valve between said exhaust port and said nozzle to prevent oil from said cylinder being discharged through said exhaust port.

26. In combination with the elements of claim 16, the outlet of said exhaust valve being hydraulically connected with said nozzle and having an exhaust port to atmosphere in the connection.

27. In a liquid dispensing apparatus, a dispensing cylinder, a piston reciprocable therein, a liquid supply tank hydraulically connected with one end of said cylinder, a liquid supply valve between said tank and said cylinder, a nozzle hydraulically connected with said end of said cylinder, a liquid dispensing valve between said cylinder and said nozzle, an actuator for opening said liquid supply valve, an actuator for opening said liquid dispensing valve, a three way master valve having a first way connected with a source of actuating fluid and a second way connected with the other end of said cylinder, an exhaust valve connected with said other end of said cylinder, an actuator for said master valve operable by movement of said piston, an actuator for opening said exhaust valve, a three way control valve and an actuator therefor, the third way of said master valve being connected with one way of said control valve and with said exhaust valve actuator to supply actuating fluid thereto at the beginning of the filling operation of said cylinder, a second way of said control valve being connected with said liquid supply valve actuator to supply actuating fluid thereto at the beginning of said filling operation, said second way of said master valve also being connected with said control valve actuator and with said liquid dispensing valve actuator for respectively supplying actuating fluid to the control valve actuator at the completion of said filling operation and thereby releasing actuating fluid from said liquid supply valve actuator and supplying actuating fluid to said liquid dispensing valve actuator so that the liquid in said cylinder may be dispensed therefrom to said nozzle, said second way of said master valve also at said completion of the filling operation supplying actuating fluid to said cylinder through its connection therewith to move said piston in a dispensing direction.

28. In combination with the elements of claim 16, a bleeder valve connected with said exhaust valve actuator, an actuator for said bleeder valve, said bleeder valve actuator being connected with said master valve to receive actuating fluid therefrom at the completion of said filling operation to bleed said exhaust valve actuator and thereby close said exhaust valve and a second bleeder valve connected with said control and liquid dispensing valve actuators to bleed them for initiating another dispensing cycle of the apparatus.

29. In a liquid dispensing apparatus, a plurality of storage tanks, a single dispensing pump communicating with all of said storage tanks for dispensing a quantity of liquid selectively from any of said storage tanks, a single dispensing nozzle communicating with said dispensing pump, a selector settable for a desired one of said storage tanks and mechanism manually operable for starting and thereafter automatically carrying on a cycle of operation for dispensing a quantity of liquid including means to cause a quantity of liquid to flow from said selected storage tank to said dispensing pump, means to stop the flow of liquid from said storage tank to said dispensing pump and means to then force such quantity of liquid from said single dispensing pump through said single dispensing nozzle.

30. In a liquid dispensing apparatus, a plurality of storage tanks, a single dispensing pump communicating with all of said storage tanks for dispensing a quantity of liquid selectively from any of said storage tanks, a single dispensing nozzle communicating with said dispensing pump, mechanism including a liquid supply valve, an air supply valve and a dispensing nozzle cleanout means operable through a complete cycle of operation to, first, cause a quantity of liquid to flow from the selected storage tank to said dispensing pump, second, close said liquid supply valve and stop the flow of liquid from said storage tank to said dispensing pump, third, open said air supply valve and thereby force such quantity of liquid from the apparatus through said dispensing nozzle, and, fourth, operate said clean-out means to clean out the last dispensed liquid from the inner walls of said dispensing nozzle, said mechanism being manually operable for starting such cycle of operation.

31. Apparatus of the character described comprising a storage tank, a pump for receiving liquid therefrom, a dispensing nozzle for dispensing the liquid from the pump, clean-out means for said dispensing mechanism, said pump operating through a dispensing cycle of receiving liquid and discharging it through said nozzle, said cleanout means thereafter operating for cleaning out the trapped liquid in the dispensing mechanism and an indicating device for indicating the completion of a dispensing cycle of operation and operated only after said dispensing cycle of operation and said clean out operation have been completed.

32. Apparatus of the character described comprising a plurality of storage tanks, a single dispensing mechanism connected with each of said tanks for receiving liquid from a selected one thereof, a single discharge nozzle for discharging the liquid from any of said storage tanks and said dispensing mechanism, a selector settable for said selected one of said storage tanks, means for operating said dispensing mechanism through a complete dispensing cycle of such selected liquid, said means including a mechanism operable manually for starting said dispensing cycle by charging said dispensing mechanism with liquid and thereafter automatically for continuing such cycle until it is completed by discharging the liquid from the dispensing mechanism through the discharge nozzle and means for retaining said mechanism, after completion of said dispensing cycle, in position to prevent further cycles of operation until again manually started.

33. In apparatus of the character described, a plurality of sources of liquid under pressure, a single dispenser hydraulically connected with each of said sources, a supply valve between each of said sources and said dispenser, a nozzle hydraulically connected with said dispenser, a dispensing valve controlling the flow of liquid from said dispenser to said nozzle, one of said supply valves being opened while said dispensing valve is closed, said supply valve closing after a measured quantity of liquid has flowed therethrough, said dispensing valve opening and said liquid being forced from said dispenser through said opened dispensing valve and nozzle thus completing a cycle of operation, means for selecting the supply valve to be opened and closed during said cycle, and means for manually starting said cycle.

34. In apparatus of the character described, a plurality of sources of liquid under pressure, a single dispenser hydraulically connected with each of said sources, a supply valve between each of said sources and said dispenser, a nozzle hydraulically connected with said dispenser, a dispensing valve controlling the flow of liquid from said dispenser to said nozzle, a selected one of said supply valves being opened while said dispensing valve is closed, the flow of liquid stopping after a measured quantity thereof has flowed through said supply valve, said dispensing valve being opened, said liquid being forced from said dispenser through said opened dispensing valve and nozzle to thereby complete a cycle of operation, means for selecting the supply valve to be opened and closed during said cycle, and means for manually starting said cycle.

35. In a liquid dispensing apparatus, a storage tank, dispensing mechanism, a dispensing nozzle and means for dispensing a quantity of liquid from said storage tank through said dispensing mechanism to said dispensing nozzle comprising an oil supply valve, an oil dispensing valve and a blow valve, said valves being operated as follows: first, said oil supply valve is opened whereby such quantity flows from said storage tank to said dispensing mechanism, second, said oil supply valve is closed and said oil dispensing valve is opened whereby such quantity flows from said dispensing mechanism to said dispensing nozzle, and third, said blow valve is opened whereby a quantity of air is blown through said dispensing nozzle.

36. In a liquid dispensing apparatus, a plurality of individual storage tanks, a dispensing pump, communicating means between each storage tank and said dispensing pump, a valve in each communicating means, a single dispensing nozzle communicating with said dispensing pump, said valves being selectively operable for dispensing a quantity of liquid selectively from any of said storage tanks through said dispensing pump to said dispensing nozzle, an exhaust valve operable to cause said dispensing pump to receive such quantity from the selected storage tank and a second valve operable by movement of said dispensing pump to filled position to admit compressed air to said dispensing pump to thereby force such quantity to said dispensing nozzle.

37. In a liquid dispensing apparatus, a plurality of individual storage tanks, a dispensing pump, communicating means between each storage tank and said dispensing pump, a valve in each communicating means, a single dispensing nozzle communicating with said dispensing pump, said valves being selectively operable for dispensing a quantity of liquid selectively from any of said storage tanks through said dispensing pump to said dispensing nozzle, an exhaust valve operable to cause said dispensing pump to receive such quantity of liquid from the selected storage tank and a second valve operable by movement of said dispensing pump to filled position to admit compressed air to said dispensing pump to thereby force such quantity to said dispensing nozzle and a valve operated by said dispensing mechanism at the completion of dispensing such quantity to admit air to said nozzle to clean the last dispensed liquid from the inner walls thereof.

IVAN L. EASTMAN.